United States Patent [19]

Wieland

[11] 4,341,367
[45] Jul. 27, 1982

[54] ROOF MOUNTED WIRE SUPPORT

[76] Inventor: Lee M. Wieland, 1403 Beach Drive Extension, Akron, Ohio 44312

[21] Appl. No.: 92,196

[22] Filed: Nov. 7, 1979

[51] Int. Cl.³ ............................................. F16L 3/22
[52] U.S. Cl. .................................. 248/68 R; 248/73; 248/74 A; 248/237
[58] Field of Search .............. 248/68 R, 73, 74 A, 248/237, 519, 539, 65, 66; 52/27

[56] References Cited

U.S. PATENT DOCUMENTS

| | | | |
|---|---|---|---|
| 2,397,291 | 3/1946 | Robertson | 248/68 R |
| 2,699,313 | 1/1955 | Larman | 248/237 |
| 2,712,916 | 7/1955 | Franz | 248/68 R |
| 2,735,639 | 2/1956 | Gilfry | 248/536 |
| 2,885,538 | 5/1959 | Mahon et al. | 248/74 A X |
| 2,990,150 | 6/1961 | Weigel | 248/68 R |
| 3,133,147 | 5/1964 | Auld | 248/237 Y |
| 3,307,811 | 3/1967 | Anderson | 248/237 X |

FOREIGN PATENT DOCUMENTS

| | | | |
|---|---|---|---|
| 1417847 | 10/1965 | France | 248/237 |
| 927731 | 6/1963 | United Kingdom | 248/74 A |

*Primary Examiner*—William H. Schultz
*Attorney, Agent, or Firm*—Oldham, Oldham, Hudak & Weber Co.

[57] ABSTRACT

A wire support including a U-shaped flat base portion with a support post carried by the flat base and extending perpendicularly from a plane defined by the support base, the support post having a wire engaging member provided at its upper end; the flat base being receivable below the lower edge of a shingle and being thin enough so as to not seriously or noticeably change the positioning of the shingle in relation to associated shingles; and the support post extending up through the slot in the lower edge of the shingle.

2 Claims, 5 Drawing Figures

U.S. Patent  Jul. 27, 1982  4,341,367
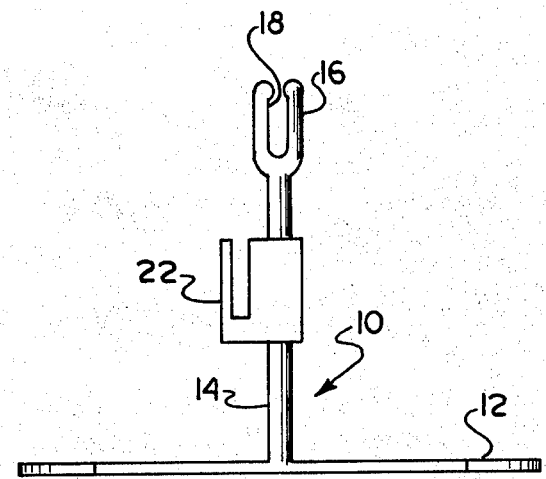
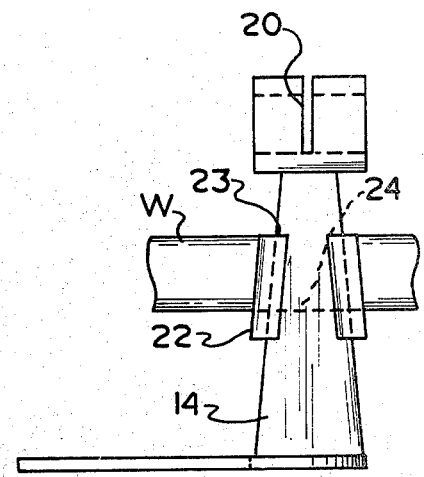
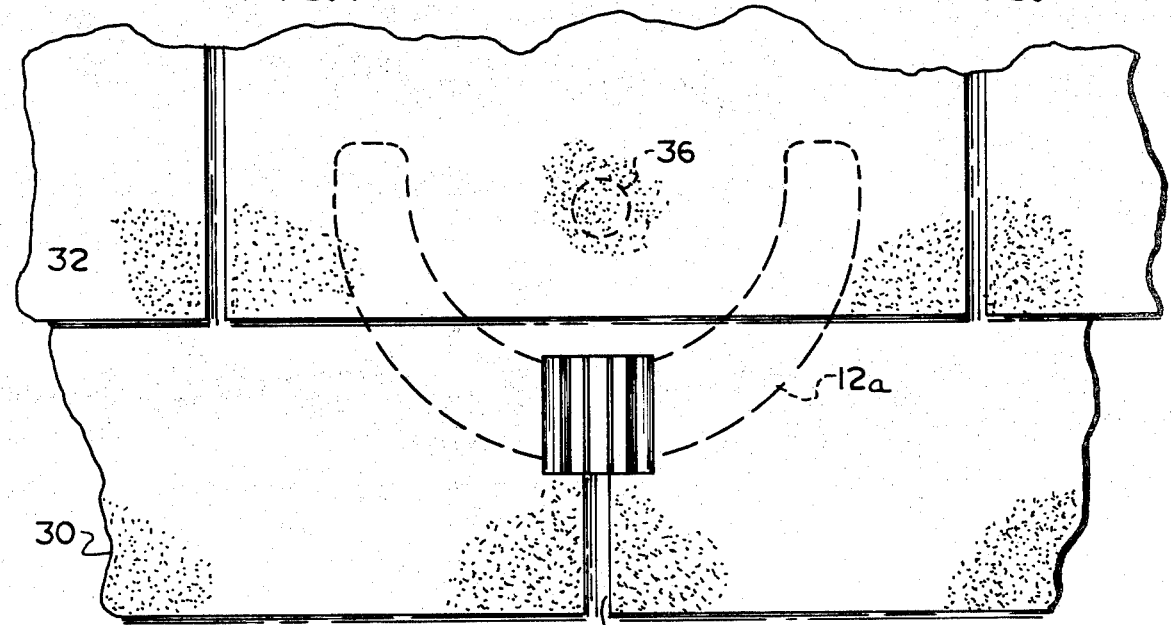
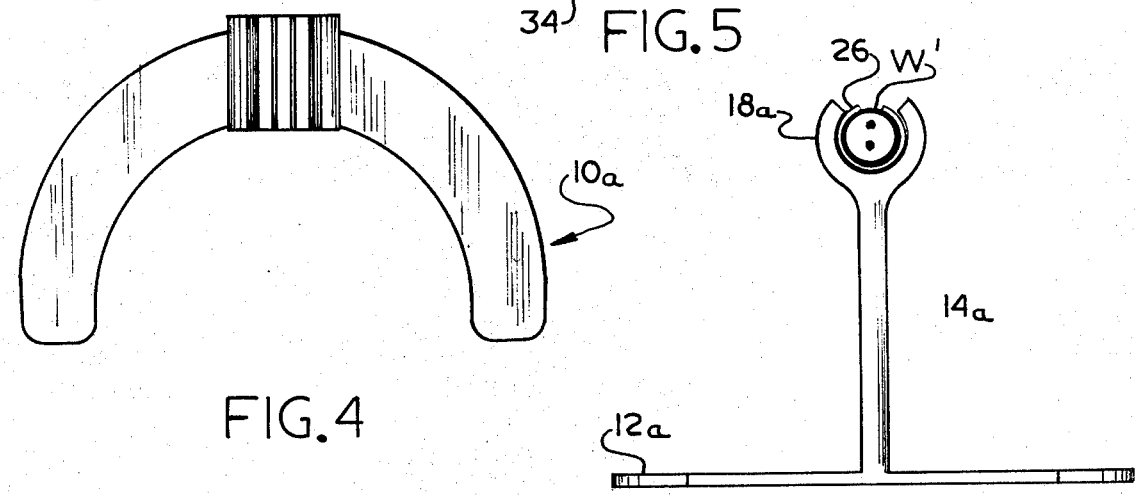

ROOF MOUNTED WIRE SUPPORT

BACKGROUND OF THE INVENTION

Heretofore there have been various types of wire support devices provided for positioning wires on roofs of buildings, houses and other structures. Particularly, a number of these prior devices have been of the type that are pounded or screwed into a supporting structure and then have a loop member at an upper end for engaging a wire and positioning it on a roof.

Some people object to these screw-in types of supports because obviously they have formed a hole through the shingles and water and other fluids can leak through the roof or structure because of the wire mounting member thereon.

Examples of prior structures in this field include an Antenna Lead Clip as shown in U.S. Pat. No. 3,133,147 that has a wire frame means that can be clipped in under a shingle to mount a wire on a vertically extending post portion, and another type of a wire mounting device is shown in Design Patent No. 250,110.

However, insofar as I am aware, there is not any good commercially available type of a wire mounting support that can be positioned on a shingled roof, for example, and be supported thereon without forming holes in the shingles or the associated support device.

Another object of the invention is to provide a wire support that can be made as a unitary molded product from plastic material, if desired, and where the wire support is low in cost, but durable in construction and adapted to withstand weathering conditions for a good service life.

Another object of the invention is to provide a wire support with a flat, U-shaped base and with a support post extending perpendicularly from such base, the support post being of a size as to be received within the slot formed in the lower edge of a conventional shingle and to permit the U-shaped flat base to be received under the associated shingle.

Yet another object of the invention is to provide a wire support device that is adapted to receive and position one or more wires therein and space the wires from the associated roof or support surface.

The foregoing and other objects and advantages of the invention will be made more apparent as the specification proceeds.

Reference now is particularly made to the drawings, wherein:

FIG. 1 is a front elevation of one support post and clip assembly embodying the principles of the invention;

FIG. 2 is a right side elevation of the support of FIG. 1;

FIG. 3 is a front elevation of another wire support embodying a modification of the structure of FIG. 1;

FIG. 4 is a plan view of the wire support of FIG. 3; and

FIG. 5 is a plan view of the support post and wire support of FIG. 3 operatively positioned in engagement with a plurality of shingles mounted upon a building.

When referring to corresponding members shown in the drawings and referred to in the specification, corresponding numerals are used to facilitate comparison therebetween.

SUBJECT MATTER OF INVENTION

A wire support for use on a roof or other building and comprising a U-shaped flat base portion lying in and defining a plane, a support post carried by the base portion and extending perpendicularly therefrom at a center portion thereof, which support post includes a wire receiving upper end portion adapted to receive a wire therein, the support post being relatively narrow in a direction transversely of the U-shaped base. This support post is longer in the direction of the length axis of the support base than in the direction of the width axis of the base whereby the base is adapted to be positioned under the lower free edge of a shingle in a roof and have the support post positioned in the slot formed in the lower edge of the shingle. A wire positioning removable clip may be present on the support post to secure a second wire to the post.

Attention now is directed to the details of the structure shown in the drawings, and a wire support of the invention is indicated as a whole in FIG. 1 by the numeral 10. This wire support 10 includes a substantially flat U-shaped base 12 that lies in and defines a plane and wherein such base 12 has a support post 14 formed therewith and extending perpendicularly from the plane of the base. The support post 14 is at a center portion of the base 12 which has arms 12b and 12c extending therefrom.

This support post 14 has a bifurcated wire receiving upper end portion 16 which has an opening 18 extending along the major length dimension of the support post whereas a transversely extending recess or slot 20 is also formed in the upper end portion of this post. Obviously, this recess 18 is adapted to receive a wire therein, and it may be of any suitable size and shape as to engage any desired wires, and the recess can be of such width and depth as to receive the wire and retain it therein with slight frictional engagement therewith, if desired.

The wire support of the invention can be made from any desired material and it can be molded from a unitary plastic material that is resistant to damage by weathering in the atmosphere, and such wire support could be made from metal, or it could be made from two different members just having the support post suitably secured to the base 12 in any known manner.

In the wire support 10 shown in FIG. 1, the support post is tapered and it removably positions a molded plastic wire engaging clip 22 thereon. The clip 22 has overhanging opposed flanges 23 to slidably engage the post and it has a wire receiving slot 24 formed therein. This end slot 24 can be of any suitable shape.

Naturally, the ends of these wire supports on the support post can be made of an annular shape for receiving a conventional wire engaging disc therein, as shown in prior art U.S. Pat. No. 3,133,147.

Attention also is directed to the structure shown in FIGS. 3, 4 and 5 of the accompanying drawings, and in such instance, the clip 22 is omitted and the modified wire support 10a normally will only position one wire therein at its upper end on its support post 14a extending up from the base 12a. The post end 18a is shown adapted to receive a circular wire W' therein. A spacer sleeve 26 is present to enable various diameters of wires to be positioned in the end 18a.

Both the wire supports of the invention are particularly adapted to be used on buildings having an operative layer of shingles secured thereto in a conventional manner. Thus, FIG. 5 shows one row of shingles indicated at 30 and a second row of shingles are indicated at 32 and are vertically adjacent and next above the shingles 30. These shingles have conventional slots 34 formed in their lower edges as made and sold in quantities today.

The wire support of the invention is particularly adapted to be positioned under shingles in the manner shown by FIG. 5, wherein the flat base 12a of the wire support would be slid in under the lower edges of the shingles 30 in the lower row of shingles, and this would slide up under the shingles 30 where the higher row of shingles 32 has overlapped the same. Normally there is a nail 36 used to secure these shingles 30 in position, and the U-shaped base does not interfere with or impair this nail or contact the same in any manner but utilizes the nail to aid in positioning the wire support. The post 14a extends up through the slot 34 in the lower edge of the shingle 30.

Frequently, shingles as made and used today, have some type of adhesive means provided on the lower faces of the shingles and this serves to adhesively bond an upper layer of shingles to the support shingle therebelow. The positioning of the wire supports of the invention in the edge slots of a shingle does not impair this adhesive bonding of adjacent layers of shingles together since the shingles only need to be raised a very short distance to slide the flat base of the wire support thereunder. Then the upper shingle can just be forced down or permitted to resume its normal position overlying the lower set of shingles and just be pressed down to aid in adhesively bonding the shingles together and retain the wire support in its given position.

The wire support of the invention is easy to position on a shingled roof. The supports 10 and 10a are durable and inexpensive and achieve the objects of the invention.

While two complete embodiments of the invention have been disclosed herein, it will be appreciated that modification of these particular embodiments of the invention may be resorted to without departing from the scope of the invention.

What is claimed is:

1. The combination of a roof with shingles thereon with a wire support comprising
   a member including a U-shaped flat base portion, lying in and defining a plane,
   a support post extending perpendicularly to said base and joined thereto at a center portion of said base,
   said support post including a bifurcated wire receiving end portion for receiving a wire between leg portions thereof,
   said support post being relatively narrow in a direction transverse of said U-shaped base, and
   said base portion being positioned below a conventional shingle having a slot extending thereinto from a lower edge thereof and having a secured upper end, and said support post extending up through said slot, said base portion having arms extending upwardly toward the upper secured end of the said shingle, and wire support being retained in position by friction with the shingles.

2. A combination as in claim 1 where said support post has a plurality of wire receiving means operatively carried thereby and one of said wire receiving means is a clip in releasable engagement with said support post intermediate said base and post end portion.

* * * * *